United States Patent [19]

Somers

[11] 4,329,780
[45] May 18, 1982

[54] METHOD OF MAKING A REINFORCED WEAR-RESISTANT LINER

[75] Inventor: M. John Somers, Dayton, Ohio

[73] Assignee: Dayco Corporation, Dayton, Ohio

[21] Appl. No.: 164,667

[22] Filed: Jun. 30, 1980

Related U.S. Application Data

[62] Division of Ser. No. 946,672, Sep. 28, 1978, Pat. No. 4,237,792.

[51] Int. Cl.³ .............................................. H01K 3/22
[52] U.S. Cl. ......................................... 29/848; 29/846
[58] Field of Search ...................... 29/825, 527.1, 846, 29/848; 264/273, 105, 271.1, 272.11, 272.14; 105/199 C; 308/137

[56] References Cited

U.S. PATENT DOCUMENTS 2,514,034 7/1950 Dean .
2,948,051 8/1960 Eisler ............................ 29/527.1 X
3,346,302 10/1967 Robinson .
3,389,461 6/1968 Hardardt .................... 264/272.11 X
3,986,752 10/1976 Bogar et al. .
4,188,888 2/1980 Cooper et al. .

*Primary Examiner*—Francis S. Husar
*Assistant Examiner*—Carl J. Arbes
*Attorney, Agent, or Firm*—Joseph V. Tassone

[57] ABSTRACT

A wear-resistant reinforced liner for a center plate structure of a railway vehicle and method of making same are provided wherein the liner is defined of a polymeric material and has a top surface adapted to engage a railway body center plate and a bottom surface adapted to engage a railway truck center plate with dual-purpose means embedded in the polymeric material which serves as a matrix therefor with the dual-purpose means having a top surface portion which comprises a top surface of the liner and a bottom surface portion which comprises a bottom surface of such liner; and, the dual-purpose means provides reinforcement for the liner and a comparatively low electrical resistance path through the liner with each surface portion in contact with an associated center plate.

12 Claims, 12 Drawing Figures

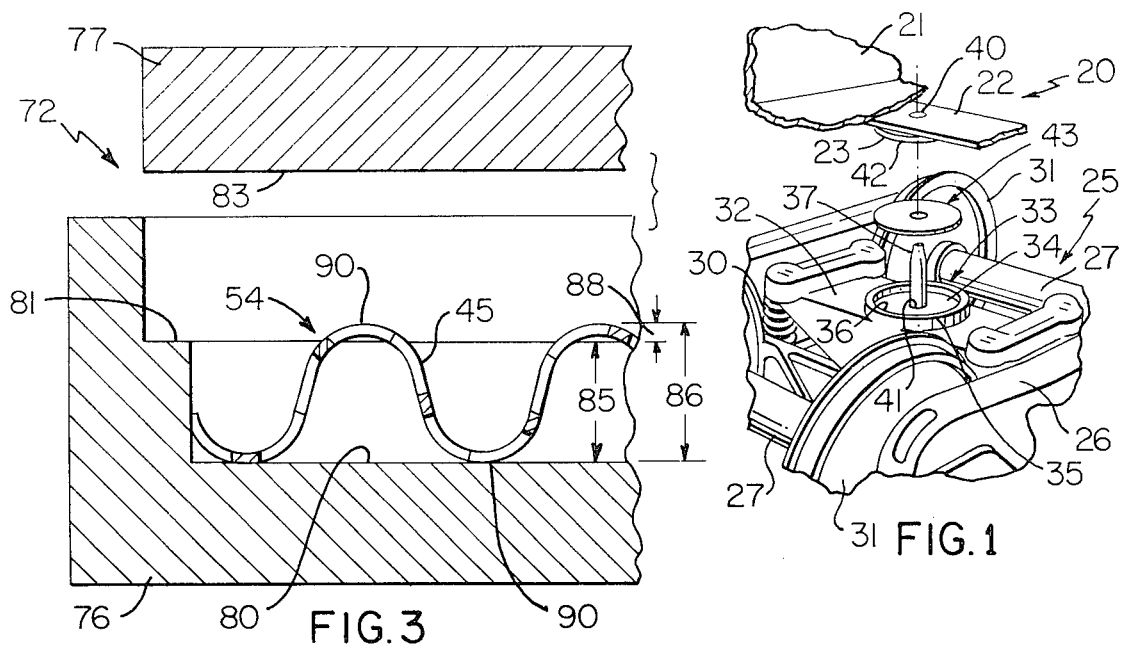
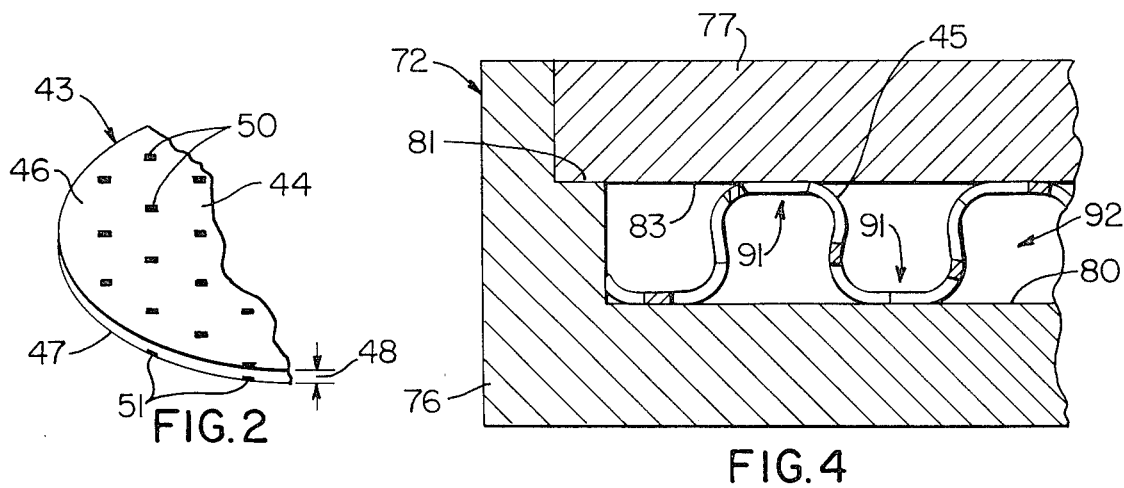
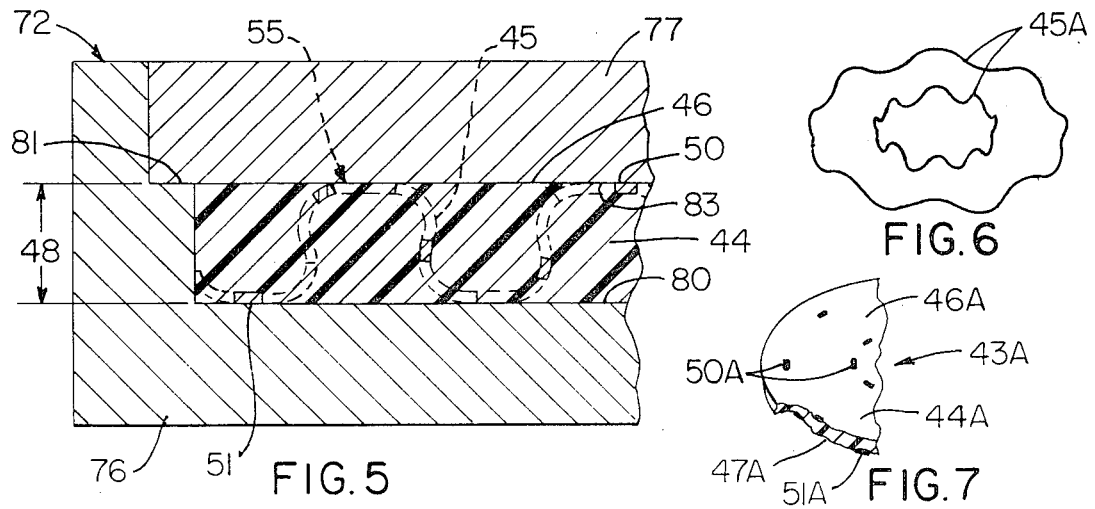

METHOD OF MAKING A REINFORCED WEAR-RESISTANT LINER

This is a division of application Ser. No. 946,672 filed Sept. 28, 1978 and now U.S. Pat. No. 4,237,792, issued Dec. 9, 1980.

BACKGROUND OF THE INVENTION

1. Field of the Invention

This invention relates to a wear-resistant electrically conductive reinforced liner for center plate structure of a railway vehicle and method of making same.

2. Prior Art Statement

It is known to provide a wear-resistant liner made of a reinforced polymeric material for a center plate structure of a railway vehicle and as disclosed, for example, in U.S. Patent application Ser. No. 841,175, filed Oct. 11, 1977 and now U.S. Pat. No. 4,188,888 issued Feb. 19, 1980. However, the reinforcement provided in a liner as disclosed in the above-mentioned application is buried or embedded such that opposed surfaces thereof cannot be contacted by a truck center plate and a body center plate whereby such reinforcement is ineffective as an electrical conductor between center plates. It has also been proposed in the above-mentioned application to provide electrical continuity through the opposed center plate engaging surfaces of such liner by utilizing electrically conductive particles embedded in the polymeric material of the liner; however, electrically conductive particles embedded in a polymeric matrix do not provide a path of optimum electrical conductivity and any increase in the quantity of electrically conductive particles per unit volume of polymeric material tends to drastically reduce the load-carrying character of the polymeric material and hence the liner.

The need for a reinforced wear-resistant liner for center plate structure is well known. It is also known that the need exists to provide effecient electrical continuity between a railway car body and a railway truck to provide dissipation of static electricity in the car body as well as provide electrical continuity from rails to a train of cars for optimum electrical signalling purposes.

SUMMARY OF THE INVENTION

It is a feature of this invention to provide a wear-resistant liner for a center plate structure of a railway vehicle having dual-purpose means embedded in a polymeric material with such dual-purpose means providing reinforcement for the liner and a comparatively low electrical resistance path through the liner and between opposed surfaces thereof normally engaged by a railway truck center plate and a railway body center plate.

Another feature of this invention is to provide a liner of the character mentioned wherein the dual-purpose reinforcement and electrically conductive means comprises a grid-like structure having a roughly sinusoidal configuration when viewed from an end thereof.

Another feature of this invention is to provide a liner of the character mentioned wherein such dual-purpose reinforcement and electrically conductive means comprises at least one electrically conductive ring which extends in an undulating path and has upper and lower apexes defining top and bottom surface portions thereof.

Another feature of this invention is to provide in a railway vehicle having; a body provided with a body bolster and a body center plate; a truck provided with a truck bolster and a bolster bowl defined by a truck center plate having an upstanding peripheral flange with the body center plate being received within the flange and being supported by the truck center plate; a wear-resistant liner disposed between the center plates and being defined of polymeric material and having a top surface which engages the body center plate and a bottom surface which engages the truck center plate; and a liner reinforcement embedded in the polymeric material which serves as a matrix therefor, the improvement wherein the reinforcement is constructed to serve the additional purpose of electrically conductive means to define a dual-purpose means having a top surface portion which comprises the liner top surface and a bottom surface portion which comprises the liner bottom surface portion and the dual-purpose means provides reinforcement for the liner and a comparatively low electrical resistance path through the liner with each surface portion in contact with an associated center plate.

Another feature of this invention is to provide an improved method of making a liner of the character mentioned.

Accordingly, it is an object of this invention to provide a liner for a center plate structure of a railway vehicle and method of making same having one or more of the novel features set forth above or hereinafter shown or described.

Other details, features, objects, uses, and advantages of this invention will become apparent from the embodiments thereof presented in the following specification, claims and drawings.

BRIEF DESCRIPTION OF THE DRAWINGS

The accompanying drawings show present preferred embodiments of this invention, in which FIG. 1 is a perspective view with parts exploded, parts broken away, and parts in cross section illustrating a portion of a railway vehicle including a portion of an exemplary truck and certain associated components and particularly illustrating a truck bolster and its center plate, a fragmentary portion of a body bolster and its center plate, a center pin disposed between the center plates, and an exemplary liner of this invention disposed between the center plates;

FIG. 2 is a fragmentary perspective view of the liner of FIG. 1;

FIGS. 3, 4, and 5 are fragmentary cross-sectional views illustrating a series of method steps employing certain cooperating components of injection molding apparatus used to make the liner of FIG. 2 and particularly illustrating a dual-purpose means or grid-like structure in the form of expanded metal disc-like structure being embedded in position in a polymeric matrix;

FIG. 6 is a perspective view illustrating another embodiment of dual-purpose means in the form of a pair of undulating rings;

FIG. 7 is a view similar to FIG. 2 illustrating the rings of FIG. 6 embedded in a polymeric material to define another embodiment of a reinforced electrically conductive liner of this invention;

DESCRIPTION OF ILLUSTRATED EMBODIMENT

Figure 8:
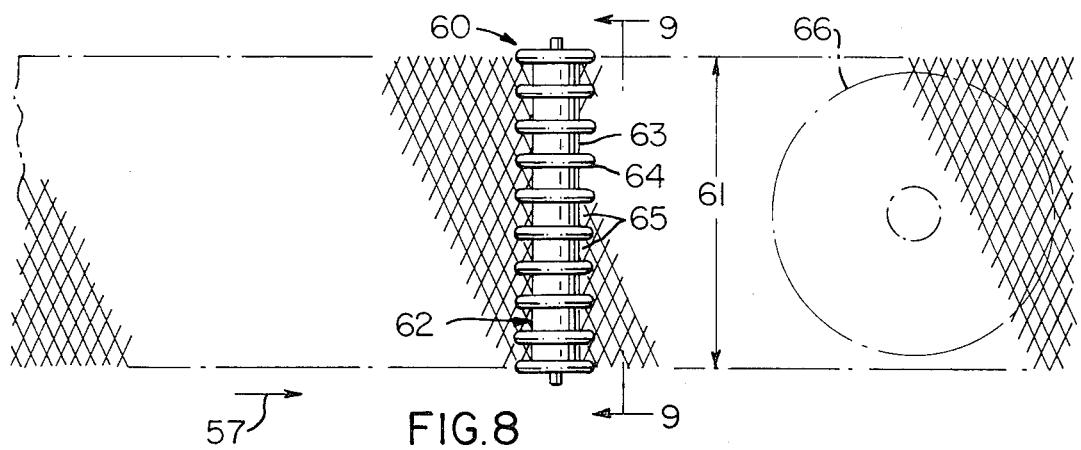
FIG. 8 is a plan view illustrating apparatus and method steps used to form an expanded metal web to define the dual-purpose reinforcement and electrically conductive means comprising the liner of FIGS. 1 and 2.
Figure 9:
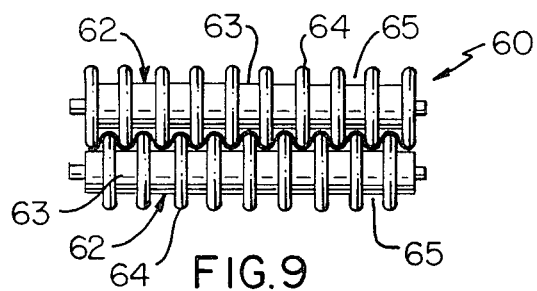
FIG. 9 is a view taken essentially on the line 9—9 of FIG. 8.

Reference is now made to FIG. 1 of the drawings which illustrates a fragmentary portion of an exemplary railway vehicle in the form of a railway car which is designated generally by the reference numeral 20. The car 20 may be of any suitable type known in the art and comprises a car body 21 of which only a small portion is illustrated and the body 21 includes body bolsters 22 at each end with the bolster 22 at only one end being illustrated. Each body bolster 22 has a body center plate 23 of a type known in the art and the entire load of the car body 21 is carried through body center plates 23 to railway car trucks provided at opposite ends of the car body 21 and a fragmentary portion of an exemplary truck is shown in FIG. 1 and designated by the reference numeral 25.

Each truck 25 comprises a structural frame assembly 26 which is carried by a pair of axles 27 through resilient mounting means in the form of compression spring sets 30. Each axle 27 has a pair of wheels 31 associated therewith with fragmentary portions of only three wheels being shown in FIG. 1 of the drawings.

The frame assembly 26 of each truck 25 comprises a truck bolster 32 which has a truck bolster bowl 33 defined as an integral part thereof and the bolster bowl 33 has a truck center plate 34 which has an upstanding peripheral flange 35 surrounding same and the flange 35 has a right circular cylindrical inside surface 36. In normal usage each flange 35 receives an associated body center plate 23 within its cylindrical surface 36 whereby each truck center plate 34 supports an associated body center plate 23. With this construction and arrangement the entire weight of the car body 21 is supported by center plates 23 at opposite ends of the railway car 20 carried by center plates 34 of associated trucks 25.

The car 20 has a center pin which is often referred to as a king bolt associated with each of its sets of center plates 23 and 34. The upper portion of each center pin 37 is particularly adapted to extend through a right circular cylindrical opening or bore 40 in the car body 21 which is in vertical alignment with a bore 40 in the center plate 23 and body bolster 22. The bottom portion of each center pin 37 extends into a blind opening or bore 41 which extends through the truck center plate 34 and continues into the truck bolster 32 and the pin 37 is supported by a surface defining the bottom of the blind bore 41.

During normal operation each truck 25 rotates or turns about its associated center pin 37; however, the center pin 37 merely serves as a safety pin preventing relative horizontal movement between an associated end of the car body 21 and its truck 25 with it being understood, as is known in the art, that the loads of the car body 21 are taken by the center plates 23 and 34 with horizontal movements being prevented primarily by cylindrical edges 42 of center plates 23 engaging the inside surfaces 36 of associated flanges 35.

As is known in the art and as outlined in detail in the above-mentioned United States Patent application Ser. No. 841,175, a lubricating liner often referred to in the art as a center plate liner is provided between the body center plate 23 and the truck center plate 34. However, in accordance with this invention an improved reinforced liner 43 is provided which serves as a lubricating liner, is wear-resistant, and has optimum electrical conductivity. The liner 43 is preferably made of a suitable polymeric material which is designated generally by the reference numeral 44 and has dual-purpose reinforcement and electrically conductive means 45 embedded in the polymeric material 44 with such polymeric material serving as a matrix for the dual-purpose means 45. The liner 43 has a top surface 46 (FIG. 2) which is adapted to engage a body center plate 23 and such liner 43 has a bottom surface 47 which is adapted to engage a truck center plate 34.

Dual-purpose means 45 has at least one top surface portion and preferably a plurality of top surface portions 50 which comprise the top surface 46 of such liner and such dual-purpose means 45 has at least one bottom surface portion and preferably a plurality of such bottom surface portions 51 which comprise the bottom surface 47 whereby the dual purpose means 45 provides not only reinforcement of the polymeric material 44 with minimal impairment of its strength and lubricating characteristics yet provides a comparatively low electrical resistance path through the liner and in particular between the top surface 46 and the bottom surface 47 of such liner due to the body center plate 23 engaging the top surface portions 50 of the dual-purpose means 45 and the truck center plate 34 engaging the bottom surface portions 51. This construction provides a direct uninterrupted electrical connection of low electrical resistance between the top surface 46 and bottom surface 47 of the liner 43.

As will be readily apparent from FIGS. 1 and 2 of the drawings the top and bottom surfaces 46 and 47 respectively of the liner 43 are parallel planar surfaces defining the thickness 48 of liner 43; and, the top surface portions 50 and bottom surface portions 51 are substantially coplanar with their respective top surface 46 and bottom surface 47. The top surface portions 50 comprise a small fractional part of their associated top surface 47 and similarly the bottom surface portions 51 comprise a small fractional part of their associated bottom surface 47; however, the surface portions comprising a planar surface are sufficient in number to provide a plurality of contact points for an associated center plate and thereby assure a direct electrical connection between the railway body center plate 23 and truck center plate 34.

Figure 11:
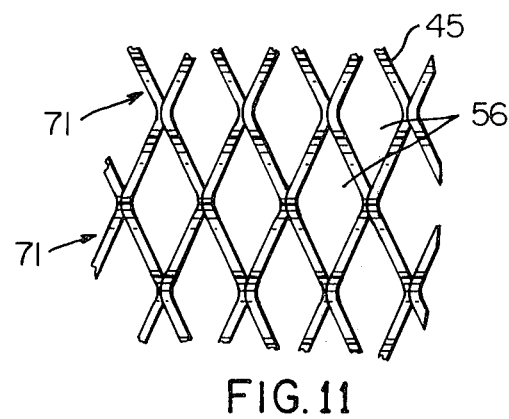
FIG. 11 is a fragmentary plan view showing an enlargement of the structure of FIG. 9.

The dual-purpose means 45 may be made of any suitable electrically conductive material and in accordance with any technique or method known in the art and a specific method for making a dual-purpose means 45 will be described in detail subsequently. In this example of the invention the dual-purpose means 45 is a grid-like structure as shown at 53 in FIG. 10 and such structure 45 has a roughly sinusoidal configuration when viewed from an end thereof and as shown at 54 in FIG. 3 prior to embedment and at 55 in FIG. 5 after embedment in the polymeric material 44. The structure 45 may be an expanded metal structure of a type known in the art and may have diamond shaped openings 56 defined therein as shown in FIGS. 10 and 11.

Having described the exemplary liner 43 with its dual-purpose reinforcement and electrically conductive means 45, reference is now made to FIGS. 8–11 of the drawings for a detailed description of one technique which may be employed in initially defining the dual-purpose means or structure 45. In particular, a sheet of expanded metal reinforcing means is suitably moved as indicated by the arrow 57 in FIG. 8 to a forming station 60 where a substantially sinusoidal configuration is defined therein across the full width 61 thereof. The sinusoidal configuration is defined by a pair of cooperating forming rollers 62 (FIG. 9) each comprised of a right circular cylindrical portion 63 having annular forming rings 64 suitably fixed thereto defining grooves 65 between each immediately adjacent pair of rings 64 whereby the rollers 62 may be considered as grooved rollers and upon moving a sheet of expanded metal material 45 therethrough the sinusoidal configuration is defined therein.

Figure 10:
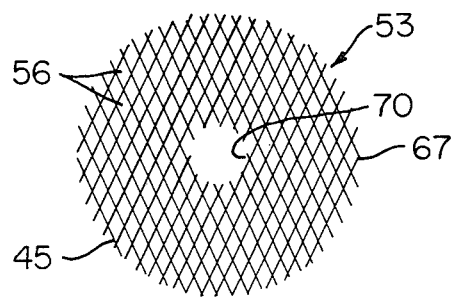
FIG. 10 is a view showing the dual-purpose reinforcement and electrically conductive means after cutting thereof to define the outer configuration thereof and an opening therethrough and prior to installation thereof in the apparatus of FIGS. 3–5.

The formed strip is then continued to a cutting station shown by dot-dash lines 66 where suitable cooperating cutting tools in the form of cooperating circular cutting knives with their back-up anvils (not shown) are employed to define a circular outline 67 in the structure 45 as shown in FIG. 10 and with a circular opening 70 provided therethrough. An enlargement of a fragment of structure 45 is shown in FIG. 11, and upwardly concave portions in the sinusoidal configuration thereof are shown by a darker shading 71 and at a pair of typical locations.

Figure 12:
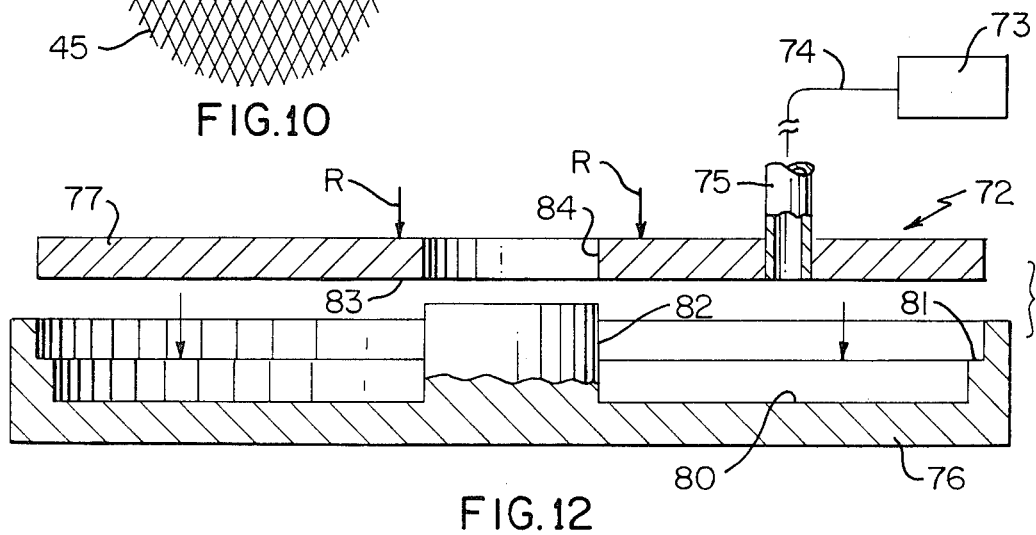
FIG. 12 is a cross sectional view with parts in elevation, parts in cross section, and parts broken away illustrating the major part of molding apparatus of which only fragmentary portions are illustrated in FIGS. 3, 4, and 5.

The dual-purpose member 45 is then embedded within polymeric material employing injection molding apparatus designated generally by the reference numeral 72 in FIG. 12 of the drawings. The apparatus 72 is used together with an extrusion machine for polymeric material which is designated schematically by rectangular block 73 and a high pressure conduit 74 extends in flow communication from machine 73 to an inlet conduit 75 of the apparatus 72.

The apparatus 72 comprises what will be referred to as a lower mold member 76 which is adapted to be supported in a fixed position such as on the bed of a standard press, or the like; and, an upper mold member 77 which is particularly adapted to be moved toward and away from the member 76 and the member 77 may be operatively associated with a movable ram R of a standard press.

The lower mold member 76 has an annular bottom surface 80 which is a substantially planar surface and an annular step or shoulder 81 disposed concentrically above and radially outwardly of the peripheral edge of the annular surface 80. The lower mold member 76 also has a central right circular cylindrical post 82 which is particularly adapted to be inserted through the opening 70 of the structure 45 with the lower surface portions of structure 45 supported on surface 80 of the lower mold member 76.

The upper mold member 77 of the apparatus 72 has a planar bottom surface 83 and a right circular cylindrical opening 84 defined therethrough which upon moving the upper mold member 77 so that its bottom surface 83 engages the annular shoulder 81, center post 82 moves within the opening 84. The dimensional clearance between the inside surface defining opening 84 and the outside surface of the post 82 is such that polymeric material introduced under pressure through the conduit 75 will not leak. The planar annular shoulder 81 is disposed above the surface 80 of the lower mold member by a distance 85 which defines the thickness 48 of the liner 43.

The method of this invention enables the provision and embedment of the dual-purpose structure 45 in a simple and unique manner. In particular, the cooperating forming rollers 72 are such that they define the roughly sinusoidal configuration of dual-purpose structure 45 having an overall amplitude or thickness 86 which is greater than the thickness or dimension 85 in lower mold member 76, as will be apparent by a comparison of the thicknesses 85 and 86 in FIG. 3 of the drawing. Further, the circular outline of structure 45 is smaller in diameter than the diameter of surface 80 of the lower mold member 76 while the diameter of opening 70 is larger than the diameter of post 82.

The structure 45, formed as shown in FIG. 10, is placed in the lower mold member 76 as shown in FIG. 3, whereby it is too thick by a distance 88 to allow the upper mold member 77 to rest on shoulder 81. The upper mold member 77 is then urged by a ram of its associated press indicated by arrows R in FIG. 12 causing initially arcuate apexes 90 to be permanently formed inwardly (actually deformed inwardly from their initial positions) as shown at 91 in FIG. 4, for example, to define top surface portions 50 and bottom surface portions 51 which are against associated surfaces 83 and 80.

Polymeric material 44 is then introduced under pressure through the conduit 75 into the mold cavity 92 of the apparatus 72 defined by members 76 and 77. The polymeric material 44 flows through openings 56 and fills the mold cavity 92 defining surfaces 46 and 47 around their respective surface portions 50 and 51. Upon cooling and removal of liner 43 from apparatus 76 the surface portions 50 and 51 blend smoothly and are coplanar with their respective surfaces 46 and 47.

Reference is now made to FIG. 7 of the drawings which illustrates another exemplary embodiment of the liner of this invention. The liner of FIG. 7 is very similar to the liner 43 therefore such liner will be designated by the reference numeral 43A and representative parts of such liner which are similar to corresponding parts of the liner 43 will be designated in the drawings by the same reference numeral as in the liner 43 followed by the letter designation A and not described again in detail.

The liner 43A has opposed parallel planar surfaces in the form of a top surface 46A and a bottom surface 47A; and, such liner has dual-purpose means 45A in the form of a pair of concentrically arranged dual-purpose rings each designated by the reference numeral 45A and illustrated in perspective view in FIG. 6. Each ring 45A has an undulating or sinusoidal configuration. The dual-purpose rings 45A may be embedded in a polymeric matrix material 44A of the liner 43A in a similar manner as described in connection with the liner 43 and employing injection molding apparatus 72 which may be suitably modified to hold the rings 45A in position between the mold halves while injecting polymeric material therein so as to define top surface portions 50A in the top surface 46A and bottom surface portions 51A in the bottom surface 47A.

It will also be appreciated that the vertical height or total amplitude of the undulating or sinusoidal path of each of the dual-purpose rings 45A is substantially the same height as the vertical height 86 of the previously described expanded metal structure 45 and a similar deformation of the undulating rings 45A is achieved as described for the dual-purpose structure 45 to define surface portions 50A and 51A which are exposed and disposed coplanar with their respective surfaces 46A and 47A. In a similar manner as described before with liner 43 this provides a direct electrically conductive path of low resistance through the entire thickness of the liner 45A between its opposed planar surfaces 46A and 47A.

In this disclosure of the invention the liners 43 and 43A have been shown as flat disc-like liners having respective dual-purpose means 45 and 45A disposed between their opposed surfaces and provided with surface portions coplanar with such top and bottom surfaces. However, it will be appreciated that the liners may be cup-shaped, hemispherical, or of any other suitable shape while having dual-purpose means as described herein exposed on their opposed center plate engaging surfaces for the purposes described.

In addition to the types disclosed herein the dual-purpose means may be of any suitable form known in the art also including woven wire mesh, undulating strips, as well as any type of preformed member or structure.

It will also be appreciated an undulating configuration or the like may be defined in any dual-purpose means using cooperating rollers or any other technique known in the art to achieve providing portions of the dual-purpose means which are disposed so they may be readily contacted by exposed surface defining walls or surfaces of associated mold members to enable deformation thereof.

The polymeric material 44 and 44A comprising the liners 43 and 43A respectively may be any suitable polymeric material used in the art for this purpose; and, such polymeric material may be any suitable molecular weight including so-called low molecular weight polymeric material and high molecular weight polymeric material having a molecular weight of over 2 million as determined by the intrinsic viscosity test widely used in the United States.

The material employed to define the dual-purpose means 45 and 45A may be any suitable material capable of providing the required performance. Preferably such means are made of metal and this includes any ferrous or non-ferrous metal. In the case of expanded metal structure 45 such structure is preferably a steel structure and may be either of the so-called standard or flattened form before shaping the undulations of sinusoidal configuration therein.

In any event a preferred feature of the method of this invention is deformation of the dual-purpose structure in a mold apparatus to assure provision of coplanar surface portions such as 50-51 and 50A-51A, for example.

While present exemplary embodiments of this invention, and methods of practicing the same, have been illustrated and described, it will be recognized that this invention may be otherwise variously embodied and practiced within the scope of the following claims.

What is claimed is:

1. In a method of making a reinforced wear-resistant liner for use between a center plate of a body bolster and a center plate of a truck bolster of a railway vehicle comprising the steps of; molding a polymeric material to define said liner having a top planar surface adapted to engage said body center plate and a bottom planar surface adapted to engage in truck center plate; and embedding a liner reinforcement in said polymeric material during said molding step, the improvement comprising constructing said liner reinforcement to serve the additional purpose of electrically conductive means and define dual-purpose means, said dual-purpose means being embedded during said embedding step with a top surface portion thereof comprising said top surface and a bottom surface portion thereof comprising said bottom surface, said top and bottom surface portions each comprising a small fractional part of its associated planar surface and said top and bottom portions being defined by integral continuous apexes in said liner reinforcement, said dual-purpose means providing reinforcement for said liner and a comparatively low electrical resistance path through said liner with each surface portion in contact with an associated center plate.

2. In a method as set forth in claim 1 the further improvement wherein said constructing step comprises constructing said dual-purpose means so that it is larger in thickness than the thickness of said liner measured between said top and bottom surfaces and forming said top and bottom surface portions employing associated parts of apparatus as forming tools during said molding and embedding steps.

3. In a method as set forth in claim 2 the further improvement comprising the preparation steps of providing a grid-like structure to define said dual-purpose means and shaping said grid-like structure to provide a roughly sinusoidal configuration therein when viewed from an end thereof prior to said forming step.

4. In a method as set forth in claim 3 the further improvement in which said molding step comprises injection molding said liner employing injection molding apparatus.

5. In a method as set forth in claim 4 the further improvement in which said shaping step comprises shaping said grid-like structure employing cooperating grooved rollers.

6. In a method as set forth in claim 4 the further improvement in which said step of providing said grid-like structure comprises providing said grid-like structure as an expanded metal structure.

7. In a method as set forth in claim 4 the further improvement in which said molding step comprises molding a polymeric material in the form of a synthetic plastic.

8. In a method as set forth in claim 2 the further improvement comprising the preparation steps of providing at least one ring to define said dual-purpose means and shaping said ring to provide a roughly sinusoidal configuration therein when viewed from an end thereof prior to said forming step.

9. In a method as set forth in claim 8 the further improvement in which said molding step comprises injection molding said liner employing injection molding apparatus.

10. In a method as set forth in claim 2 the further improvement in which said forming step comprises the step of engaging said associated parts of said mold apparatus between a platen and a ram of a standard press.

11. In a method as set forth in claim 10 the further improvement in which said constructing step comprises constructing said dual-purpose means of a metallic material.

12. In a method as set forth in claim 10 the further improvement in which said molding step comprises molding said polymeric material in the form of a high molecular weight synthetic plastic material.

* * * * *